Dec. 7, 1943. R. S. TROTT Re. 22,403

ENGINE MOUNTING

Original Filed June 10, 1938 4 Sheets-Sheet 1

INVENTOR.

Rolland S. Trott

ENGINE MOUNTING

Original Filed June 10, 1938 4 Sheets-Sheet 2

INVENTOR.
Rolland S. Trott

Dec. 7, 1943. R. S. TROTT Re. 22,403

ENGINE MOUNTING

Original Filed June 10, 1938 4 Sheets-Sheet 3

INVENTOR.

Roland S. Trott

Dec. 7, 1943. R. S. TROTT Re. 22,403

ENGINE MOUNTING

Original Filed June 10, 1938 4 Sheets-Sheet 4

INVENTOR.
Rolland S. Trott

Reissued Dec. 7, 1943

Re. 22,403

UNITED STATES PATENT OFFICE 22,403

ENGINE MOUNTING

Rolland S. Trott, Denver, Colo.; Eleanor J. Trott executrix of said Rolland S. Trott, deceased Original No. 2,249,194, dated July 15, 1941, Serial No. 212,887, June 10, 1938. Application for reissue July 15, 1941, Serial No. 402,557

12 Claims. (Cl. 248—5)

My invention relates to engine mountings, and especially to engine mountings for radial engines used in airplanes, and is a reissue of my Patent No. 2,249,194, granted July 15, 1941.

The object of my invention is to provide an engine mounting which will cushion all engine unit forces, and thereby eliminate their transmission to the airplane.

A further object is to provide an engine mounting which will cushion each of the main sets of forces of the engine unit, without creating any new forces by such cushionings.

Further objects will appear during the following description.

A statement regarding engine unit forces in their relation to present radial engine mountings will make an understanding of my invention easier to grasp.

In present radial engine mountings, the engine mount framework is attached to the fuselage of the airplane generally at four points immediately in front of the fire-wall, and the engine is attached to the front of this engine mount framework about two feet or more in front of the fire-wall, by about nine engine bolts on about a twenty-four inch bolt circle.

The four mounting bolts or pins on the fire-wall sometimes have thin rubber bushings, and the engine bolts also may have circumferentially elongated rubber bushings.

But, regardless of these and other details, present radial engine mountings are so poor in their results that the finger tips placed against any part of any airplane so far built, will, when the engines are running, disclose that the plane is being vibrated by the engine forces.

Many flying men even seem to think that in an airplane, engine vibration is necessary, that it always has been present and always will be present.

There are at least four sets of engine unit forces which are at present responsible for the vibration of all planes.

These forces are as follows:

(1) The draft force, or the pull of the propeller. (2) The torque force or reaction to the twisting of the propeller. (3) Transverse forces, or forces in planes normal to the crankshaft axis, and which may be out of balance forces due to out of balance in the propeller or other moving parts, or to the movements of the pistons and connecting rods in a radial engine, or to resultants of the torque forces. (4) Forces due to the engine unit weight, which puts the upper members of the present type of mounting framework in tension and the lower members in compression.

The only way to cushion a force is to provide cushioning movement to absorb the force, and this cushioning movement in an airplane must be such as not to create any new forces, or the final results may be as bad as, or worse than, the original forces.

In present engine mountings an almost rigid construction is employed. In some there is a slight amount of rubber, as stated above, but the cushioning movements provided are really very small, too small to do much good; and the reason for this is that, if more movement were permitted, this cushioning movement would create new forces that would be worse than the original forces if left uncushioned.

The facts regarding the four above-mentioned sets of forces are as follows:

*First: The draft force.*—If there were no transverse forces operating, the draft of the propeller would perhaps come equally on all four engine mount connections with the fuselage. But this actually can never occur.

In a radial engine, the torque forces, the movements of the connecting rods and of the pistons, the presence of out of balance in the propeller or other moving parts, or one blade of the propeller pulling more than another, will result in transverse forces and will create a condition which will tend to swing the engine in a small circle or other orbit. As this slight swinging or gyratory movement takes place, the actual instantly acting draft connection changes, in step with the swinging movements, so that each of the four connections of the engine mount with the fuselage, in turn is the actual momentary draft connection.

So the draft on the plane is not a steady pull but is a pull which travels about the four draft connections in step with the slight gyratory or swinging movement of the engine due to the transverse forces mentioned. This continual movement of the effective draft connection produces a jerky pull or draft upon the plane which can only result in vibration in the plane. So, though the actual pull of the propeller may be steady, the action of the transverse forces upon the draft force, results in an actual vibrational pull or draft force upon the airplane.

To illustrate: In a certain well-known nine cylinder 1000 horse-power radial engine, the vibratory force due to connecting rod movements at a speed of 2160 revolutions per minute, is 1500 pounds.

When this 1500 pound transverse force is momentarily acting in the plane of two diagonally opposite tubular members of the engine mount framework, one of these diagonally opposite members is subjected to compression and the other diagonally opposite member is subjected to tension.

Thus, for this combination of draft force and transverse force, the more transverse cushioning movement permitted in present type mountings, the greater would be the result upon the draft force and the greater would be the vibration due to shifting of the actual momentary draft connection.

That is, new forces would be created.

In my invention, this movement of the draft connection and the resulting vibration is overcome by a single centrally located resilient draft connection, which provides steady and non-vibrating pull or draft upon the plane, in spite of all transverse cushioning movements of the engine unit.

*Second: The torque forces.*—In the above-mentioned 1000 horse-power engine each cylinder is more than six inches in both bore and stroke, and each cylinder develops a maximum of 111 horse-power.

So, when such a cylinder fires, there is a great torque shock, tending to oscillate the engine in a direction opposite to the direction of rotation of the propeller.

The only way this torque shock can be cushioned is by torque cushioning oscillation. But, this torque cushioning oscillation must take place without creating any new forces.

The rotation of a perfectly balanced flywheel can take place without the creation of any new forces; but if the flywheel is unbalanced the rotation of the flywheel will create tremendous new forces.

This holds just as true about the oscillation of a balanced flywheel; it can take place without the creation of any new forces. And likewise, the oscillation of an unbalanced flywheel will create new forces. But, in a flywheel, the weight only, has to be considered. In a balanced flywheel, the axis passes through the center of mass of the flywheel, and this is enough to avoid the creation of any new forces.

But, in a radial engine, this is not enough. Not only the center of mass must be considered, but also the propeller, and the draft connection between the engine unit and the plane.

So, in my engine mounting for airplane engines, the axis is so located that it passes through the center of the propeller hub, through the center of mass of the engine unit, and through the single draft connection of the engine unit with the plane.

That is, in my invention torque cushioning oscillation of sufficient amplitude is accomplished without movement of the propeller, the center of mass, or the draft connection with the plane, by so mounting the engine unit as to provide and maintain an axis of oscillation that passes through the center of the propeller hub, through the center of mass of the engine unit, and through the single, centrally located draft connection.

When this is done, sufficient torque cushioning oscillation may be provided to properly cushion the torque jerks of the big cylinders and without creating any new forces from any cause whatever, because of the above-mentioned location of the axis of oscillation.

In present radial engine mountings, the lower members of the mount framework are in compression, even if a slight mount of rubber is employed there is nothing in the construction to locate and maintain any particular position for an axis of oscillation, and if any slight oscillation does take place the axis for this oscillation is probably at or near the level of the lower members of the mount framework, which would locate the propeller hub and the center of mass considerably above such as axis.

Thus, in present type mountings, the greater the amplitude permitted in torque cushioning oscillation, the greater will be the forces created due to unbalance of the oscillation both as regards the center of mass and as regards the center of the propeller hub.

Ample torque cushioning oscillation with present radial engine mountings would be like oscillating a flywheel with an off-center shaft.

For this reason, present radial engine mountings are, and must be, substantially rigid.

Also, any oscillation with present mountings, slight though it may be, can not take place about an axis passing through the draft connection with the plane, since the actual draft connection, as explained above, revolves about the four points of attachment with the plane, as the engine swings or gyrates, in answer to the transverse forces.

My axis through the center of the propeller hub, through the center of mass and through the single draft connection, is the only solution that will permit the proper and necessary amount of torque cushioning oscillation without creating new and very destructive forces.

Oscillation that would move the propeller hub, the center of mass or the draft connection, with respect to the engine unit, would create new and destructive forces.

Thus in the present type of radial engine mountings, the more torque cushioning oscillation permitted the greater would be the vibration due to the off-center position of the propeller, the center of mass and the draft connection, which in present type mountings is not stationary.

That is, in present type mountings, if ample torque cushioning oscillation were permitted, new forces would be created.

*Third: Transverse forces.*—These forces as mentioned above, combine with the draft force, to provide a jerky, rotating, four-point draft connection between the engine unit and the fuselage, one point at a time being the momentary, main draft connection.

These transverse forces, in the present type of radial engine mounting, tend to put tension successively on each of the four points of attachment with the fuselage and to add to the draft force at one point while tending to put the diagonally opposite frame member in compression.

If the engine unit were in perfect running balance and had no transverse forces and were mounted to oscillate about a longitudinal axis passing through the center of the propeller hub and through the center of mass, a single central draft connection might not be needed and might give little benefit if used. But, as a matter of fact, no engine is in perfect running balance, and all engines have transverse forces. So, my single central draft connection is necessary, if a vibrationless draft force is to be delivered to the plane.

Suppose we now consider another condition with the crankshaft, say, slightly out of balance;

this will change the actual location of the center of mass of the engine unit, providing a new center of mass, and the crankshaft will tend to revolve about a new axis passing through this new center of mass.

If the engine unit is mounted freely enough to permit this new axis to act as the actual axis, then the engine will still run in perfect balance, but the former axis will revolve about this new axis.

Or, if the engine case is now made out of balance with respect to this new axis, this also will change the location of the center of mass, when force cushioning oscillation is under consideration, and again the engine will oscillate in perfect balance about the new axis passing through the new location of the center of mass, if the mounting is such as to permit sufficient freedom of movement so that this may be accomplished.

But neither of these conditions can be fulfilled if the engine is mounted at four points on the fuselage.

In my invention, the mounting includes one rear, central, resilient mounting on the fuselage, so that the transverse cushioning movements permitted the engine to cushion the transverse forces may take place without creating any new forces.

So, the same single, central attachment principle which permits a steady non-vibrating draft also permits the transverse cushioning movements of the engine unit about a single central rear mounting without creating any new forces, by such movements.

In some cases the rear mounting may also act as the single central draft connection, but I do not favor this for the really large engines.

Thus with transverse forces, if enough cushioning movement is provided, new forces will be created due to the four point connection in present type mountings, with the firewall. These forces are independent of the draft force, but when they are combined with the draft force the results are very much greater.

Thus, in present mountings increase of transverse cushioning movements creates new forces.

*Fourth: Weight forces.*—In present mountings the weight of the engine is carried by the framework with part of the members in tension and part of the members in compression. This puts the engine weight entirely out of balance and very top-heavy, as far as any torque cushioning oscillation is concerned, as was explained above under Torque forces. Since the weight is not located so that it can remain unmoved during engine oscillation, the weight forces would generate new forces if ample oscillation were permitted to properly cushion the torque forces.

It may be that some of the above-mentioned four sets of forces tend to overlap; but it is thought the above explanation will at least make the matter clear to any mechanic versed in this art.

At any rate it is now clear that in present radial engine mountings cushioning movements of any kind will tend to create new forces which very possibly might be more destructive than the original forces.

Thus in present type mountings, every attempt to provide a really ample cushioning movement for any force has had to be abondoned, and this has resulted in mountings whose cushioning movements are so slight as to amount to substantially rigid mountings.

In my invention I provide a rearward extension for the engine (which may be designed either as an integral part of the engine, or as an attachment to the engine, as shown in the drawings) and locate the engine partly by the rear mounting, which is located at the rear end of this extension, and partly by the front mounting which is located adjacent the rear of the engine proper, so that the engine weight is carried at two longitudinally separated points.

If the weight distribution of engine and accessories remains the same as at present, the rear mounting point will carry a negative load, and the front mounting point will carry more than the weight of the engine, in load. Though it is possible to redistribute engine and accessory weights so the rear mounting will carry a positive load, it will generally be found to be unnecessary. The two mountings locate and maintain the proper axis of oscillation, which passes through the center of the hub of the propeller, through the center of mass of the engine unit (even if redistribution of weight is required for this), and through the single central draft connection between the engine unit and the fuselage.

When the propeller is geared, it is sometimes offset from the crankshaft, in which case a redistribution of engine or accessory weights may be necessary in order to locate the center of mass on the axis.

My engine unit consists of the propeller, the engine, and accessories, and the rearward extension which carries the rear mounting.

All necessary controls and connections are to be so constructed and arranged as to permit all of the engine cushioning movements without failure in their functions.

What takes place in my method of cushioning out of balance or transverse forces, can perhaps best be illustrated by reference to a boy's wooden top. When new, if properly made, the top will spin in perfect balance about what may be called its geometric axis. It should be noted that the top has but one mounting, the rear mounting, where the peg is centered on the ground, but the top finds its own axis because its upper end, where all the weight is, is free to move transversely. It finds the axis which passes through its center of mass.

If a chip is split from one side of the top, the center of mass will be shifted away from where the chip was taken. Then when the top spins, it will spin about an axis that passes through this new center of mass, and the former axis that was called the geometric axis, will then revolve about this new axis. The top will appear to wobble, but except for wind resistance it will be as perfectly balanced as before, because it is free to find this new axis and revolve about it.

In my mounting I provide a comparatively unloaded and comparatively stationary rear mounting, and a front mounting which carries most of the weight and provides most of the transverse cushioning movements.

By this construction, the engine is comparatively free to find its own axis and revolve and oscillate about it in much the same manner as in the case of the top above-mentioned.

In my invention the rear mounting includes rubber so constructed and arranged as to carry either positive or negative load resiliently, resiliently resist oscillation of the engine unit, and resiliently resist any longitudinal movement of the engine unit, and to permit universal movement.

The front mounting consists in metal mounting means adjacent the rear of the engine so constructed and arranged as to locate the axis of oscillation to pass through the center of the rear mounting, through the center of mass of the engine unit and through the center of the hub of the propeller. This metal mounting means may be a plain metal bearing, or any type or kind of anti-friction bearing, or may be an outer metal track cooperating with a series of anti-friction bearings mounted on the nine engine bolts on the 23⅜ inch diameter bolt circle, or may be an inner track cooperating with a series of antifriction bearings properly supported, all of which will be clearly understood by any mechanic versed in this art.

For, whatever the kind or type of metal bearing means employed, the result will be the same in that the center of this front metal bearing means positively locates the axis of oscillation in the plane of this bearing means. That is, regardless of what else takes place, any oscillation that takes place must take place about the axis located by this metal bearing means and the rear mounting on the fuselage; and these two mountings are so constructed and arranged as to make said axis pass through the center of mass and the center of the hub of the propeller. Since for smaller engines the rear mounting also may act as the single central draft connection, this axis will also be located to pass through the center of the single central draft connection.

The front metal mounting means, of whatever construction, is carried by a proper rubber cushion or other proper resilient means, to provide for the proper cushioning of all transverse forces and for the self-centering action mentioned above.

This front mounting cushion means, of whatever construction, is properly carried in a framework, similar to the present engine mount, and attached in a similar manner to the fuselage directly in front of the firewall.

In my construction the rear mounting carries much less weight than the front mounting since it is more remote from the engine cylinders and the center of mass.

This construction permits the same kind of self-centering action for perfect balance, as illustrated above in connection with a boy's top. There is, however, this difference; the top has only rotation; the enginex has both rotation and oscillation, but the self-centering will take place in the engine very much like it takes place in the top.

The details of construction of my invention will be better understood by reference to the drawings, in which.

Figure 1:
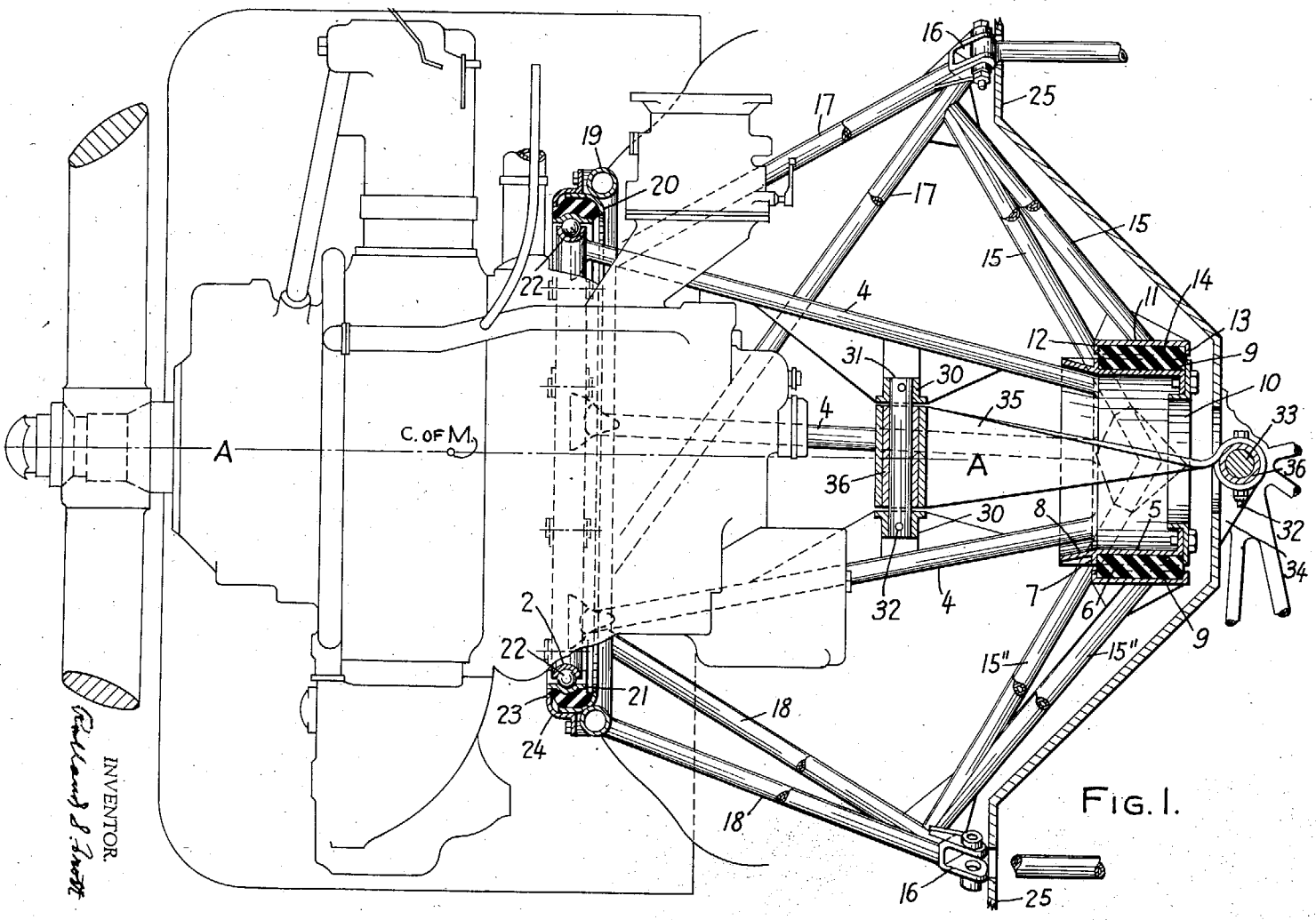
Fig. 1 is a side view in partial section, of my engine mounting, and with some of the coacting parts of the plane, and with the engine and propeller indicated.
Figure 2:
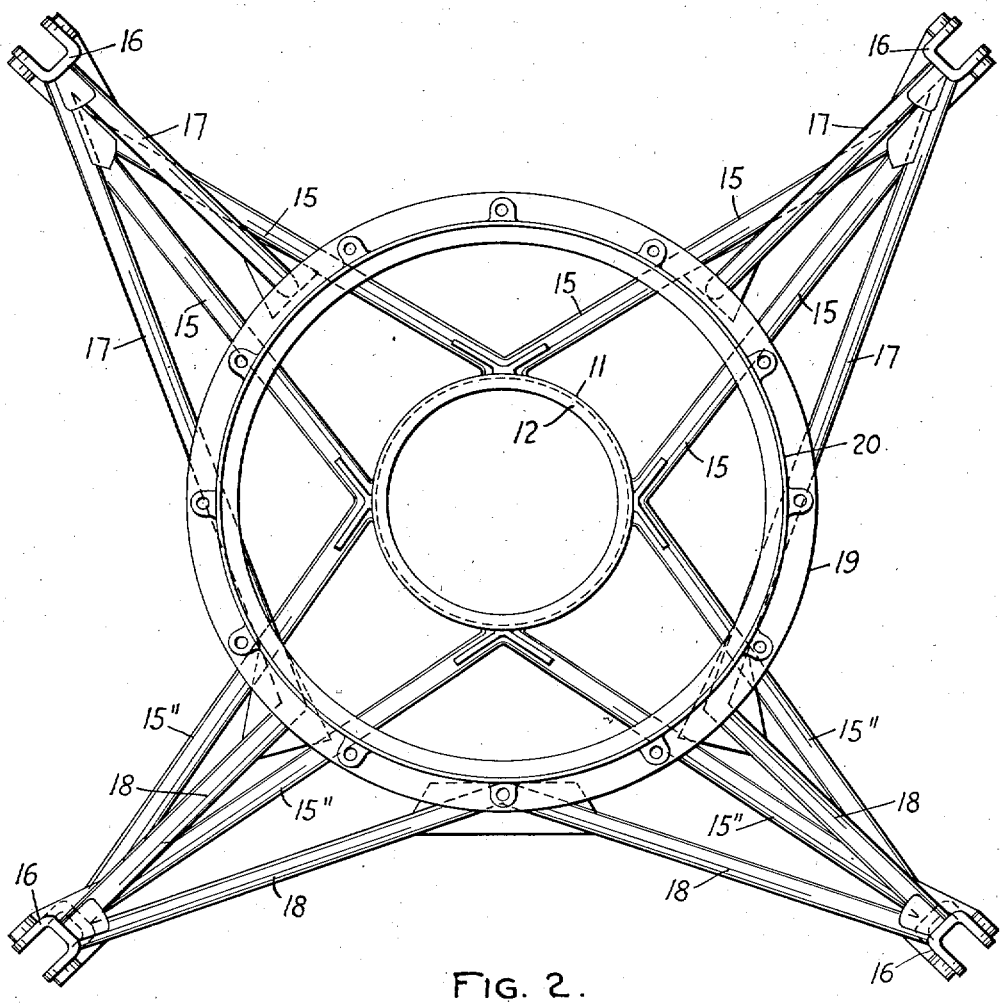
Fig. 2 is a front view looking toward the airplane, of the main parts of my mounting shown in Fig. 1, for supporting the engine unit upon the airplane.

The engine outrigger or extension is provided with an inner ball race 2, which is provided with nine engine fitting bolt holes 3, for securely bolting the outrigger to the rear of the engine by the same bolts which in present engine mountings mount the engine upon the framework that is carried upon the front end of the fuselage.

The ball race 2 has securely welded to it, with proper gussets and reinforcements, the tubular members 4.

The ring 20 is properly welded to and supported by the tubular ring 19. The outer wall race 21 is placed about the inner ball race 2 before the outrigger is bolted to the engine, and the notches 26 of the two races are made to register with each other. The balls 22 are then fitted in between the two ball-races, through the registered notches and when the balls are all in place the outer race is turned 180 degrees, so that the notches 26 will no longer register with each other, which prevents any of the balls from getting out of place from between the races.

The ball race rubber cushion 23, and the retainer ring 24 are then put into place about the outer ball race 21, and the outrigger is then properly bolted to the engine.

The rear rubbers 9 are put into place between the abutments 14 and the end plates 12 and 13 of the rear frame ring 11.

The engine unit is then ready to be mounted in its framework.

The ring 5 and its abutments 6 are located to slide in between the rubber cushions 9, while the ball bearing rubber cushion 23 slides into the ring 20. The retainer ring 24 is then properly bolted to the ring 20 and the tubular ring 19, thus clamping the rubber cushion 23 in place, and the thrust plate 10 is properly attached and locked to the ring 5 thus clamping the rubbers 9 in place.

The entire engine unit and its framework may now be properly attached to the airplane at its four clevises 16, the four pins or bolts passing through the clevises 16 and the airplane yokes just in front of the firewall 25. In some cases rubber bushings may be used for the pins or bolts.

In the mounting thus far described, it will be seen that the rear rubbers 9 combine with the rest of the rear mounting construction to provide or permit universal movement, to resiliently transmit the entire draft of the engine unit to the plane and to resiliently oppose torque cushioning oscillation about the axis which passes through the center of the single draft connection, through the center of the front mounting, through the center of mass of the engine unit, and through the center of the hub of the propeller; while the front mounting maintains the axis in its proper location and provides ample transverse cushioning for the transverse forces. It should be especially noticed that in order to have all the draft taken at the rear single central draft connection, the retainer ring 24 should have the proper slight amount of clearance with the rubber cushion 23, though this is not clearly shown in the drawings.

For planes with comparatively small engines the mounting thus far described may be in most cases sufficient; that is, the entire draft and the entire torque is taken through the rubbers 9 of the rear mounting.

The draft will be delivered through the thrust plate 10 to the rubber members 9 and to the rear frame ring 11.

When the transverse forces are cushioned by the cushion ring 23, causing transverse gyrations of the engine, still the draft will be unchanged, and will be transmitted to the plane through the rubbers 9 of the single central draft connection provided by the rear mounting.

But, while the transverse and draft forces are thus being properly cushioned, each time a cylinder fires there is a torque force.

This torque force will tend to oscillate the engine unit about the axis provided by the front and the rear mountings, and this oscillation will be resiliently opposed by the rubber cushions 9 cooperating with the abutments 6 of the rear engine ring 5 and with the abutments 14 of the rear frame ring 11.

But since this oscillation takes place about the axis provided by the two mountings, its amplitude is of little consequence, so long as it is sufficient to properly cushion the torque shock, and so long as all engine controls and connections are properly designed and built to permit such oscillations and transverse cushioning movements without altering their actions. That is, all engine unit controls and connections are to be so constructed and arranged as to permit all engine unit movements without change in the performance of said controls and connections, as any mechanic versed in the art will understand.

Since the torque cushioning oscillation takes place about an axis passing through the single draft connection, through the center of mass, and through the center of the propeller hub, no new forces whatever will be created by this oscillation.

It should be noted that the entire engine unit and framework may be removed from the plane exactly as is the case with present type mountings; that is, simply by the removal of the four clevis bolts just in front of the fire-wall.

It should also be noted that if desired, removal of the bolts of the thrust plate 10 and of the bolts of the retaining ring 24 will permit the engine unit to be removed from the engine supporting framework, leaving the engine supporting framework attached to the plane.

It should also be noted that removal of the nine engine bolts which attach the outrigger to the engine will permit the engine to be removed from the outrigger, and from the plane.

In case the mounting is used for a large and powerful engine, a slight addition may be made to properly insure taking care of the draft and the torque forces without too great cushioning movements.

The aligned rings 30 are properly attached to the outrigger framework by welded gussets and reinforcements.

The rings 30 receive the engine draft wrist-pin 31, which is held in the two rings 30 by the bolts and nuts 32.

The plane draft wrist-pin 33 is properly held in place in rings that are gusseted and reinforced in the plane framework as indicated at 34, or otherwise.

The wrist pin 33 is held in place by the bolts and nuts 32, similar to those holding the wrist pin 31 in place.

The construction supporting the wrist-pins 31 and 33 are to be strong enough and properly supported, to stand the strains they have to meet, as any mechanic versed in the art will understand.

It will be noted that the axes of the wrist-pins 31 and 33 cross the axis A—A at right-angles to each other. The draft and torque spring 35, has an eye at each end supplied with a rubber bushing 36, whose thickness and consistency will determine the amount of resilience in the draft connection. This spring 35 is twisted 90 degrees, so that its ends may be received by the wrist-pins 31 and 33.

The pivotal movements at the wrist-pins, the cushioning of the rubber bushings, and the twist of the spring 35, combine to make certain that no uncushioned vibration may be transmitted by the spring 35 from the engine unit to the airplane. This construction acts to reinforce the single draft connection and the resilient torque opposition of the rear mounting.

Though the width and thickness of the spring 35 should, of course, be designed for the particular engine served, it may be from an eighth to three-eighths of an inch thick, and from three to six inches wide and twenty or more inches long. But, in any case, the spring should be designed and built to transmit the draft and the torque with certainty and safety and still permit as much cushioning of the draft and of the torque as is required. It should be noted that the draft and torque spring 35 combines with, or reinforces the rear mounting of the engine unit, to transmit both the draft and the torque forces resiliently from the engine unit to the plane.

Figure 11:
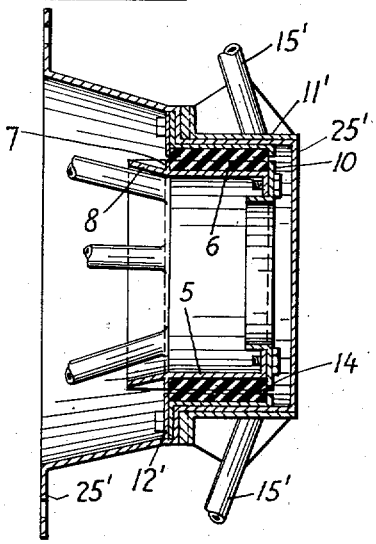
Fig. 11 is a view in partial section of a modified form of the rear framework to carry the rear engine support.
Figure 5:
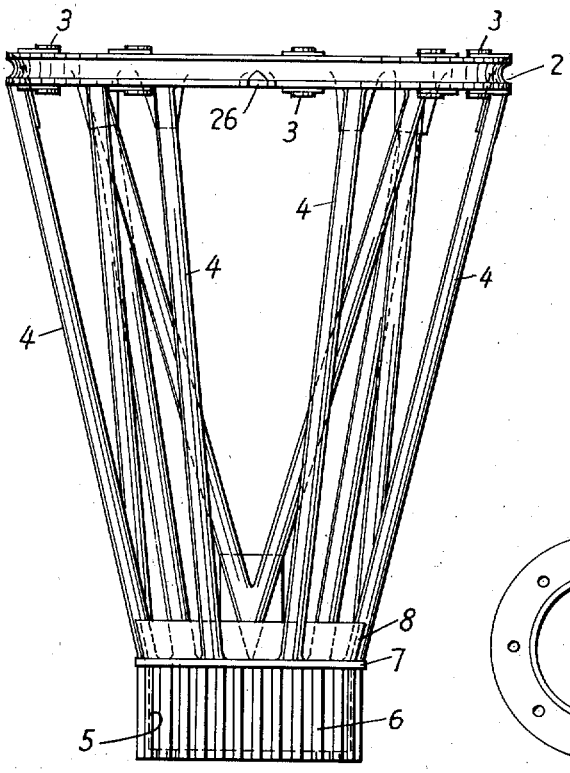
Fig. 5 is a view of Fig. 4 as seen from above.
Figure 6:
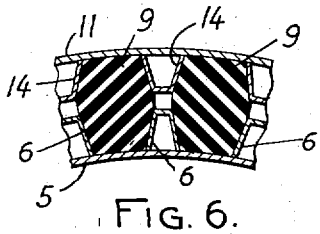
Fig. 6 is an enlarged partial sectional view of the rear engine support shown in Figs. 4 and 5.
Figure 9:
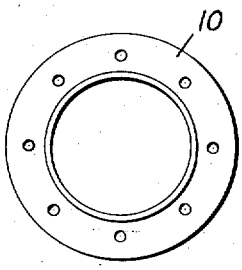
Fig. 9 is an end view of the rear mounting thrust plate.
Figure 10:
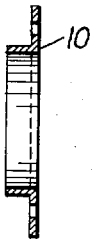
Fig. 10 is a sectional view of Fig. 9.
Figure 4:
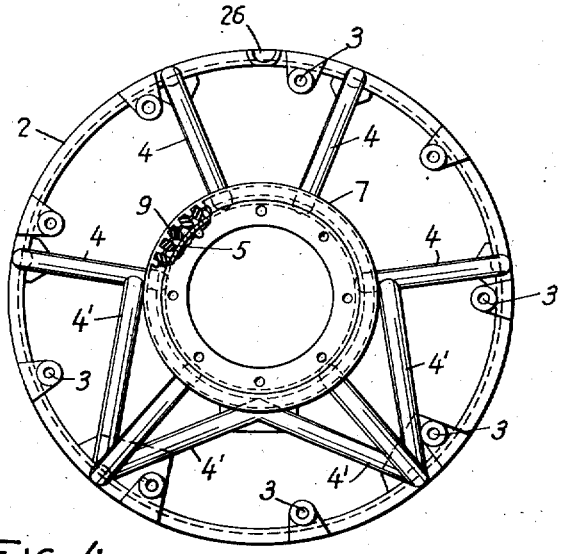
Fig. 4 is an end view of the engine outrigger and rear support, as seen when looking from the rear toward the front.

Fig. 11 illustrates a modified form for the support upon the airplane, of the rear mounting of the engine unit.

The flange of the firewall plate 25' may be bolted to either the front or the rear face of the firewall proper. It is supported in the rear frame ring 11', which in turn is properly supported by the tubular framework members 15', or otherwise. The front plate 12' is properly bolted to the firewall plate 25' and to the rear frame ring 11'.

This separate firewall plate may, of course, be used in the Figure 1 construction, if desired, either with or without the spring 35.

When the engine unit is removed from the airplane with this rear mounting support construction, the front plate 12' is removed in any case, whether the front framework is left attached to the plane or not, and the front framework may be removed from the plane by removal of the four clevis pins, or the engine may be removed from the front framework by removal of the retainer ring 24; or the engine alone may be removed by removal of the nine engine bolts which attach the outrigger to the engine. For large engines a draft and torque spring should be used with this rear mounting.

Figure 12:
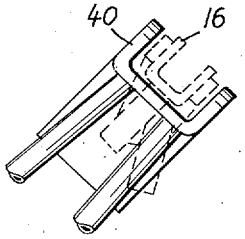
Fig. 12 is a detail showing a modified form of connection of the front framework and of the rear framework to the fuselage, adjacent the firewall.

Fig. 12 is a modified form of construction by which the front framework and the rear framework may be joined together detachably, instead of permanently.

The front framework clevis 16 is straddled by the rear framework clevis 40, and the same long clevis pin passes through both clevises and the airplane framework yoke.

Figure 13:
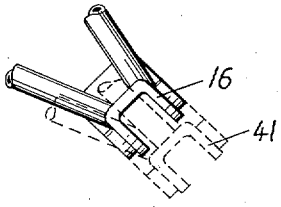
Fig. 13 is a modified form of connection of the front framework and of the rear framework with the fuselage, adjacent the firewall.

In Fig. 13 still another modified form of mounting the front and the rear framework is shown. The front framework clevis 16 is mounted on its yoke by its pin in the usual way, and the rear framework clevis 41 is mounted on the airplane framework and yoke by an entirely separate clevis and clevis pin.

Figure 14:
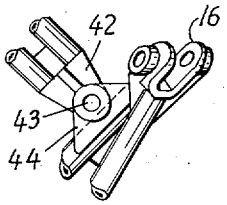
Fig. 14 is a modified form of connection between the front framework and the rear framework.
Figure 3:
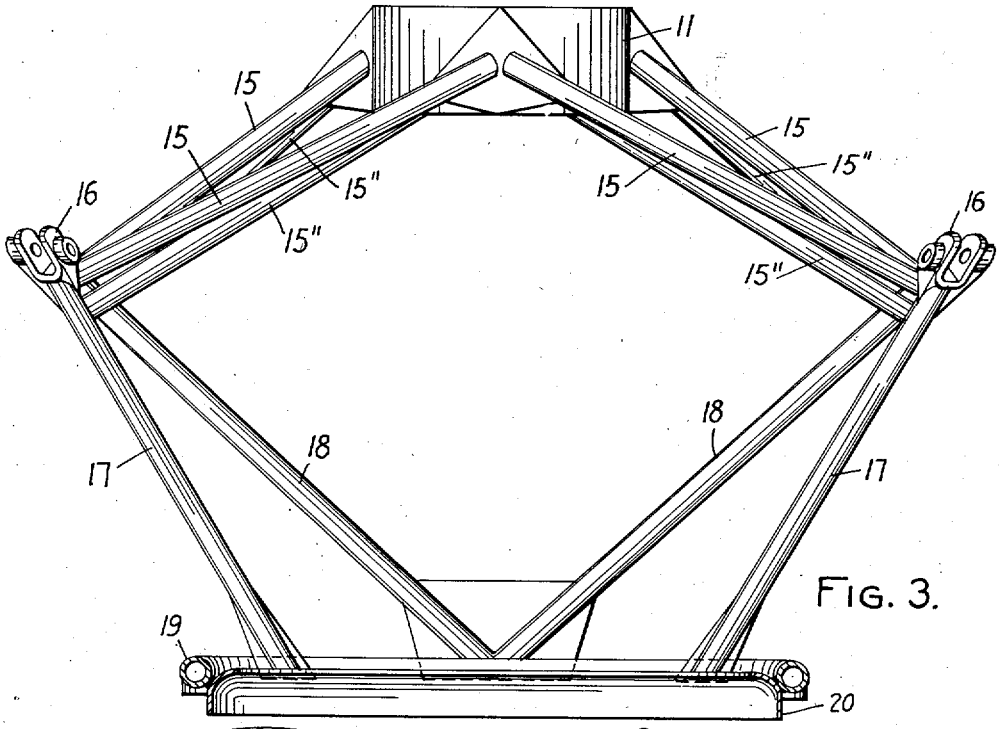
Fig. 3 is a view of Fig. 2, as seen from above.
Figure 8:
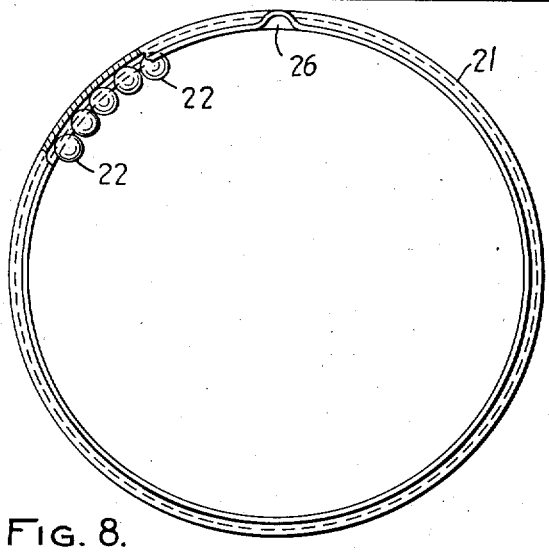
Fig. 8 is a side view of Fig. 7.
Figure 7:
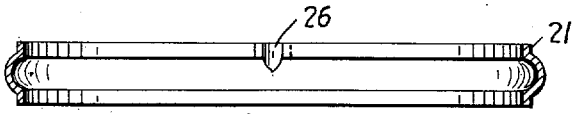
Fig. 7 is a sectional view of the outer ball race of the front mounting.

Fig. 14 shows a modified form for joining the front and the rear framework detachably instead of permanently.

The clevis 42 is joined by the pin 43 with the clevis yoke 44 of the front framework, and the clevis 16 of the front framework is mounted in the usual way upon the airplane framework and yoke.

Figure 15:
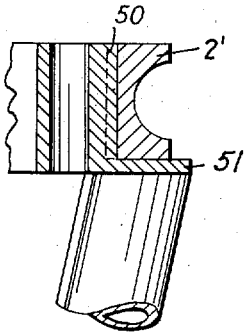
Fig. 15 is a fragmentary detail showing a modified form of construction of the inner ball race of the front mounting and the front outrigger ring.

Fig. 15 shows a modified form of construction for the inner ball-race and front ring of the outrigger.

The inner race 2' is made entirely separate from the ring 50. The ring 50 has a flange 51 which acts to clamp the race 2' against the engine.

In this construction the inner ball race may easily be replaced when worn without the necessity of replacing the front ring of the outrigger.

It will now be seen that my invention consists in a construction in which the draft connection means of the engine with the plane is at a single point, remote from the cylinder portion of the engine.

This draft connection means may be at the rear of an outrigger, as shown, or the engine and accessories may be designed to extend the rear of the engine and take the place of the outrigger. The essential point is that whatever the details of construction, the rear resilient mounting of the engine unit, which acts as the draft connection means of the engine unit with the plane, should be spaced considerably to the rear of the engine cylinders.

The draft connection means may be attached to the plane to the rear of the plane of the present firewall as shown; or it may be right at the firewall line, or if desired may even be in front of the firewall.

But, however these details are constructed, the draft connection means should also include resilient means acting to support positive or negative load and to resiliently oppose the torque cushioning oscillation of the engine unit, while at the same time permitting any and all force cushioning movements of the engine unit, without movement of the point of draft of the engine with the plane.

Any other set of details of construction than those shown for properly supporting the front engine mounting upon the plane and permitting force cushioning movements in any direction may be employed, so long as the torque cushioning oscillation takes place about the axis of oscillation passing through the center of the propeller hub, the center of mass, and the draft connection.

Thus the pull of the engine on the plane will be steady and acting upon one point, and yet through resilient means the torque forces may be cushioned by plenty of torque cushioning oscillation without creating any new forces, and the transverse forces may be cushioned by transverse cushioning movements without transmitting such movements to the plane or creating any new forces.

Naturally, there are many changes that can be made in my invention without departing from the essence thereof, which consists of a resilient, single, central draft connection means between the engine unit and the plane, and engine supporting means supporting the engine on the plane and permitting all necessary force cushioning movements about the draft connection or about the axis passing through the draft connection as a center, whether the resilient draft and the resilient torque connections between some part of the engine unit and some part of the plane are entirely of rubber or are of rubber and steel.

Thus it will be seen every force that might be transmitted from the engine unit to the plane, can, in my mounting, only be transmitted through resilient members, and the construction is such that the cushioning movements can be so calibrated or designed into the construction as to provide such cushioning for every engine force that the senses will not be able to perceive them; and these cushioning movements will none of them create new forces.

It will be appreciated by anyone versed in the art that many variations are possible in the construction details of the particular structures illustrated, and that various slight changes may also be made in my method without departing from the essence thereof.

It will also be appreciated that, though my invention has been described mainly in connection with a nine cylinder radial engine, it will operate equally well with a seven cylinder or a double row fourteen cylinder radial, or any other kind, type, or construction of engine, if the same theories and understanding were employed by a competent mechanic versed in the art.

This description deals especially with airplane engines with the propeller in front, but is just as true if the engine were mounted in a Zeppelin. Any mechanic versed in the art will understand that the method, the principles and even the details of construction will apply equally well in Zeppelin or airplane engines with the propellers to the rear of the engines, with only such necessary changes as a mechanic will readily understand. So, I do not wish to be limited to the exact illustration and description made herein, but what I claim as new and desire to protect by Letters Patent is as follows:

1. In an airplane engine and propeller unit mounting, movable draft connection means between the said unit and the plane, spaced remotely from the cylinder portion of the engine unit, and compound supporting means longitudinally spaced toward the engine cylinders from said draft connection means, said compound supporting means comprising resiliently mounted rotary bearing means for resiliently supporting the said unit on the plane for continual, permanent oscillatory movement about an axis and combining with said draft connection means to provide a single axis of oscillation about which said unit may oscillate in balance at all times and under all conditions, and said draft connection means being composed of a series of longitudinally extending rubber elements in the form of a hollow skeleton cylinder, the outer portions of the said elements fitting into longitudinally extending grooves in a member carried by said airplane, and the inner portions of the said rubber elements fitting into longitudinally extending grooves in a means carried by said engine.

2. In an airplane engine and propeller unit mounting, movable draft connection means between the said unit and the plane, spaced remotely from the cylinder portion of the engine unit, and compound supporting means longitudinally spaced toward the engine cylinders from said draft connection means, said compound supporting means comprising resiliently mounted rotary bearing means for resiliently supporting the said unit on the plane for continual, permanent oscillatory movement about an axis and combining with said draft connection means to provide a single axis of oscillation about which said unit may oscillate in balance at all times and under all conditions, and a torque member composed of a longitudinally extending leaf steel spring movably connected at one end to the engine and the other end to the airplane.

3. In a mounting for an airplane engine and propeller unit, an extension acting as a part of the engine to form a unit therewith and extending substantially concentric with the engine crankshaft, mounting means attaching the end of said extension remote from the engine to the airplane and providing a single movable connection means and providing for resiliently opposed movements between the extension and the airplane in any direction, mounting means adjacent the other end of the extension and supporting the said unit on the airplane and providing for cushioning movements in any direction and including oscillatory, axis-locating means, said mounting means combining resiliently mounted rotary bearing means to provide for and maintain a single axis of oscillation about which the engine and propeller unit may oscillate in balance at all times, and said mounting means remote from the engine being provided with a series of longitudinally extending grooves, a series of rubber elements fitting in said grooves, and said elements surrounded by and received in a series of longitudinal grooves provided by a mounting element carried by said airplane.

4. In a mounting for an airplane engine and propeller unit, an extension acting as a part of the engine to form a unit therewith and extending substantially concentric with the engine crankshaft, mounting means attaching the end of said extension remote from the engine to the airplane and providing a single movable connection means and providing for resiliently opposed movements between the extension and the airplane in any direction, mounting means adjacent the other end of said extension and supporting the said unit on the airplane and providing for cushioning movements in any direction and including oscillatory, axis-locating means, said mounting means combining resiliently mounted rotary bearing means to provide for and maintain a single axis of oscillation about which the engine and propeller unit may oscillate in balance at all times, and a torque member composed of a longitudinally extending leaf-steel spring movably connected at one end to the engine and the other end to the airplane.

5. In an airplane engine and propeller unit mounting, movable draft connection means for resisting translation of the engine in a longitudinal direction between the said unit and the plane, spaced remotely from the cylinder portion of the said unit providing universal cushioning movement between said unit and the plane, and compound supporting means longitudinally spaced toward the engine cylinders from said draft connection means, said compound supporting means comprising a resiliently mounted anti-friction bearing which provides for free oscillation of the engine for resiliently supporting the said unit on the plane for oscillatory movement about an axis and combining with said draft connection means to provide a single axis of oscillation about which said unit may oscillate in balance at all times and under all conditions.

6. In a mounting for an airplane engine and propeller unit, an extension acting as a part of the engine to form a unit therewith and extending substantially concentric with the engine crankshaft, extension mounting means attaching the end of said extension remote from the engine to the airplane and providing a single movable connection means and providing for resiliently opposed movements between the extension and the airplane in any direction, front mounting means comprising a resiliently mounted anti-friction bearing located adjacent the other end of said extension and supporting the said unit on the airplane and providing for free oscillations of the engine about an axis extending approximately through the longitudinal center of the unit.

7. In an airplane and propeller unit, unit mounting means for mounting said unit upon its plane and consisting of front mounting means having a metallic axis-locating pivotal portion and a shock cushioning portion surrounding the latter, cushion rear mounting means similar to the front mounting means said front mounting means comprising a resiliently mounted anti-friction bearing which provides for free oscillation of the engine about an axis extending approximately through the longitudinal center of the unit, and torque cushioning means not acting to disturb the cushioning actions of the front and rear mounting means, said front and rear mounting means being constructed, arranged and located to pass the axis of oscillation they provide through the center of mass of the propeller, and through the center of mass of the engine.

8. In an airplane engine and propeller unit mounting, a single draft connection between the engine unit and the plane, mounting means providing for resiliently resisted movement between the draft connection and the plane in any direction, including universal movement and oscillatory movement, and front mounting means longitudinally spaced from said draft connection and supporting the engine unit upon the plane for cushioning movements in any direction, said front mounting means having metallic pivotal means for providing free oscillation of the engine about a positively located axis and resilient means supporting said metallic pivotal means upon said plane.

9. Mounting means for an engine, including a metallic axis-locating bearing surrounding a part of the engine and connected with the body in which the engine is located, said mounting means comprising a resiliently mounted anti-friction bearing which provides for free oscillations of the engine about an axis extending approximately through the longitudinal center of the engine, and rubber held in shear between an extension from the engine and a portion of the body to resiliently restrain oscillations of the engine.

10. Mounting means for airplane engines comprising a cushioned, metallic, anti-friction bearing secured to the airplane frame and surrounding a part of the engine and providing for free rotary motion about the crank-shaft axis under the influence of torque impulses, but resiliently resisting longitudinal movements and movements transverse of the crankshaft axis, an extension on said engine, and a resilient mounting disposed between said extension and the airplane frame acting through shear to resiliently restrain rotary motion of said engine.

11. Mounting means for an airplane engine comprising a cushioned, metallic, anti-friction bearing secured to the airplane frame and surrounding a part of the engine and providing for free rotary motion about an axis under the influence of torque impulses, but resiliently resisting longitudinal movements and movements transverse of the crankshaft axis, and a resilient mounting located longitudinally remote from said bearing and constituted by two concentric elements, one of which is connected with the engine and the other with the airplane frame, with a medium therebetween acting through shear to resiliently restrain rotary motion of said engine.

12. Mounting means for airplane engines including in combination with an engine, a propeller driven thereby, an extension from the engine connected with the airplane frame, mountings located at each end of the extension, one mounting secured to the airplane frame and surrounding a part of the engine providing for free rotary motion about the crankshaft axis under the influence of torque impulses, the other mounting located at the outer end of the extension and resiliently resisting longitudinal movements as well as movements transverse to the crankshaft axis, the torque cushioning oscillation taking place about the axis of oscillation passing through the center of the propeller hub, the center of mass of the engine, the center of the two mountings, and the center of the draft connection with the airplane.

ROLLAND S. TROTT.